Aug. 11, 1959  K. M. ALLEN ET AL  2,899,044
VIBRATING CONVEYORS
Original Filed Sept. 23, 1955  3 Sheets-Sheet 1
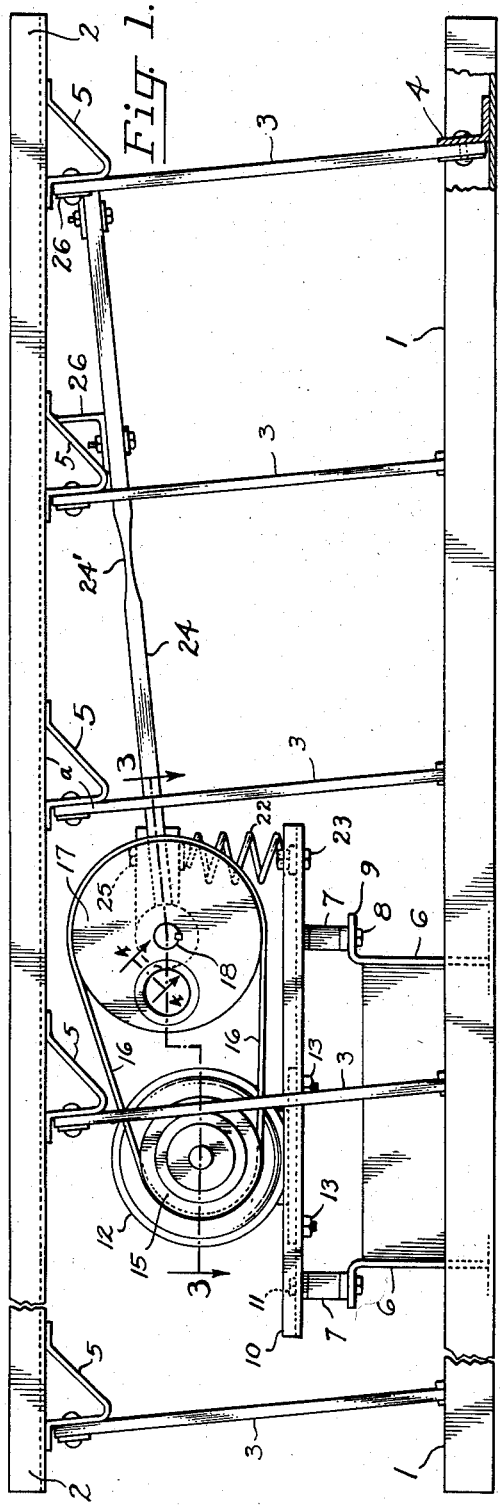
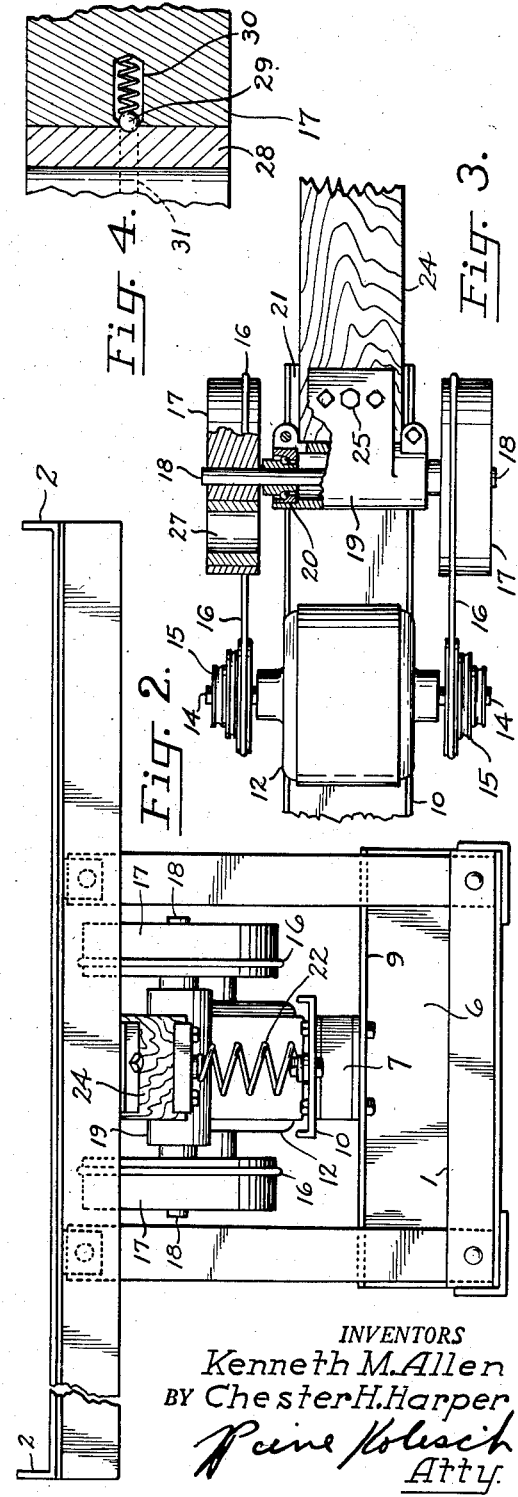
INVENTORS
Kenneth M. Allen
BY Chester H. Harper
Atty.

Aug. 11, 1959  K. M. ALLEN ET AL  2,899,044
VIBRATING CONVEYORS

Original Filed Sept. 23, 1955  3 Sheets-Sheet 2

INVENTORS
Kenneth M. Allen
BY Chester H. Harper
Atty.

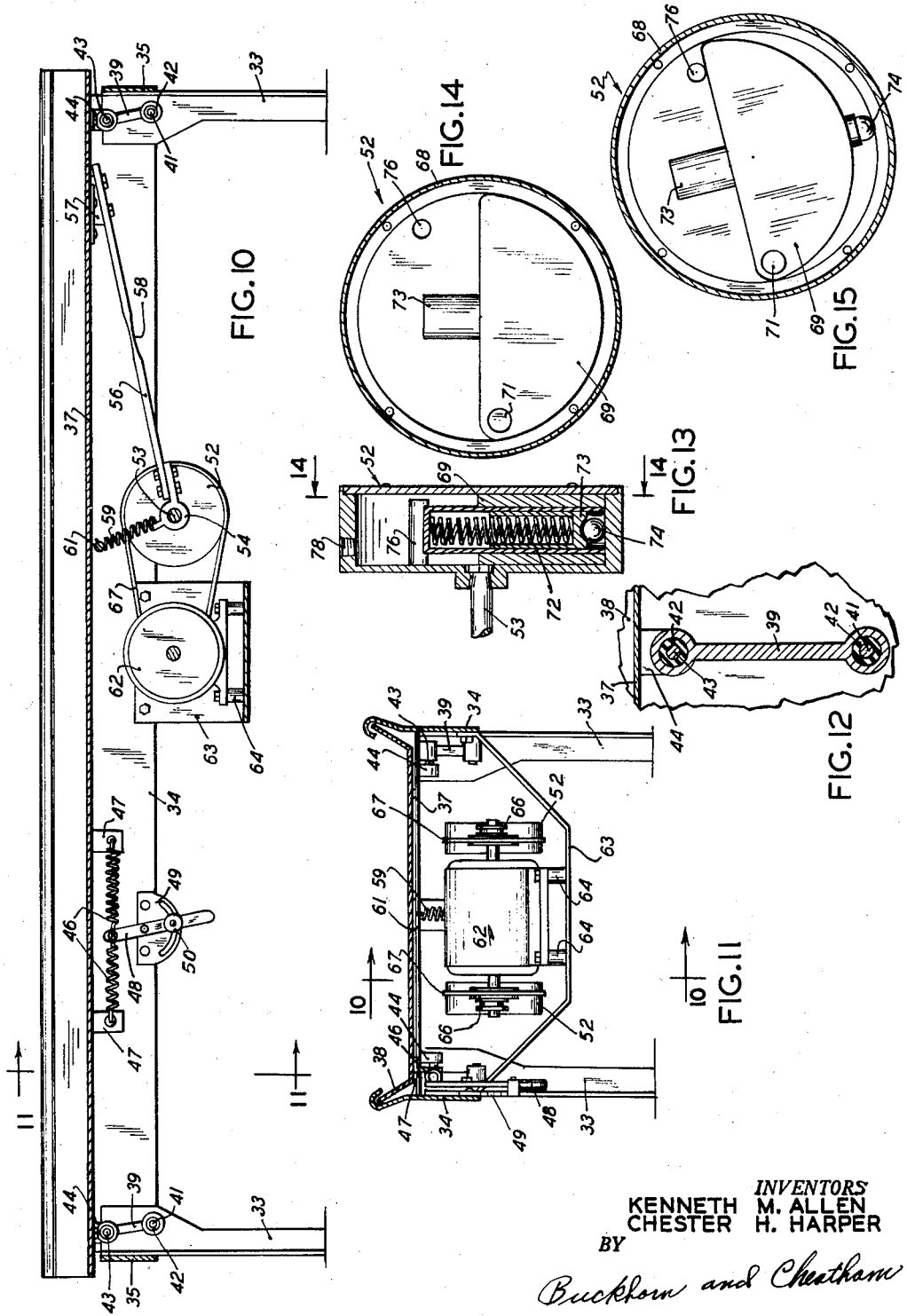

United States Patent Office 2,899,044
Patented Aug. 11, 1959

2,899,044

VIBRATING CONVEYORS

Kenneth M. Allen and Chester H. Harper, Newberg, Oreg., assignors to Allen-Harper, Inc., Portland, Oreg., a corporation of Oregon Continuation of application Serial No. 536,178, September 23, 1955. This application June 11, 1957, Serial No. 665,051

9 Claims. (Cl. 198—220)

This invention relates to vibrating conveyors and more particularly to mechanism which will efficiently convey even fragile material along a surface without damage thereto in a manner permitting workers readily to sort and inspect the material, while at the same time the transmission of vibratory movement to portions of the building in which the conveyor is positioned is almost completely eliminated. This application is a continuation of our copending application Serial No. 536,178, filed September 23, 1955, which in turn is a continuation in part of our application Serial No. 445,536, filed July 26, 1954, and now abandoned.

In many plants, such as fruit and vegetable canneries, it is desirable to transport objects from one location to another as well as inspect, sort, grade, wash, etc. the objects. It is desirable that the conveying and inspecting, etc. operations be carried on simultaneously, however, we know of no machinery which will satisfactorily perform both of these operations at the same time.

A common type machine employed in such plants is of the endless belt conveyor type in which an object deposited on a belt is carried along by frictional contact between the belt and object. These conveyors have certain drawbacks, some of which are expense and complexity of mechanism and where it is necessary to maintain sanitary conditions it is difficult to do so because of the nature of the machinery in an endless belt conveyor. Furthermore, when products are being conveyed on a belt they remain fixed in one position relative to the belt and are not spread out or moved around to permit easy inspection and sorting.

Another type of machine employed is a vibrating screen for grading materials and also various types of vibrating conveyors have been used. Unbalanced rotating weights and also eccentrics rotating about a fixed axis have been employed to produce the vibrating motion, however, the mechanisms heretofore employed have required heavy housings for sustaining the forces generated or large sized bearing and supports for fixing the axis of the eccentrics. Generally such machines involve heavy, rugged mechanisms in order to withstand the vibrations to which they are subjected, and to operate satisfactorily must be bolted to the floor or otherwise anchored in place. The noise and vibration produced by such machines are considerable and only materials which can withstand rough handling are suitable for use therewith. Food products which may be bruised or otherwise injured, such as fruits, are not suitable for use therewith. Furthermore the known vibrators are not satisfactory for inspection of the material because of the violent shaking to which the materials are subjected causes them to bounce around and prevents inspection.

In the eccentric drives referred to above, the eccentrics are mounted upon a shaft journalled for rotation in bearings fixedly supported on the frame of the machine or upon the floor or other portion of the building in which the machine is positioned, such that the reaction to the vibratory motion imparted to the conveyor or screen is transmitted to the frame of the machine and to the building, resulting in undue noise and shaking of such building. In most machines employing unbalanced rotating weights, such weights are journalled directly upon the element to be vibrated so that the component of vibratory motion normal to the vibrating surface of the conveyor is at least as great as the component parallel to such surface. If the element to be vibrated is secured to the frame of the machine or other support in a manner tending to minimize such component of vibration normal to the vibrating surface, then the reaction to the forces tending to produce such component of vibration is transmitted to such frame or other support. Attempts have been made to eliminate such normal component of vibration by providing complicated rotor structures having unbalanced weights rotating in opposite directions and attempts have been made to eliminate the effect of such component by resiliently mounting a separate support for both the driving motor and the unbalanced rotating weight for oscillating motion substantially normal of the conveying surface of the element to be vibrated. In either case the weight of a heavy supporting structure or the weight of a driving motor or both must be resiliently supported and the rotating unbalanced weight must be great enough not only to impart the desired oscillatory motion to the mass of the conveying element in a direction substantially parallel to the conveying surface but also to impart such motion in the same direction to the entire mass of a heavy supporting housing or driving motor.

In the vibrating conveyor structure of the present invention, the driving motor is mounted upon a separate support so that its mass need not be vibrated. An unbalanced rotor is driven through a flexible driving means from the motor and is resiliently mounted for independent oscillatory motion generally normal to the surface of the vibrating conveying surface. Also the conveying element is separately resiliently mounted. The resilient mounting for the unbalanced rotor and the conveying element are such that the conveying element and unbalanced rotor react against each other so far as forces substantially parallel to the conveying surface is concerned. This means that substantially the only forces that reach the frame of the machine or other stationary support are reaction forces transmitted through the resilient support for the unbalanced rotor and reaction forces transmitted through the support for the vibrating conveying element. In accordance with the present invention both the mass of the unbalanced rotor and the mass of the structure oscillated thereby can be made much lighter than in previous structures. The resilient portions of the supports for the unbalanced rotor and conveying element may therefore be correspondingly lighter, i.e., have less spring force, so that the vibration forces transmitted to the frame or other stationary support are minimized.

When an unbalanced rotor, such as contemplated in the present invention, is resiliently supported it will have at least one critical speed, i.e., a speed of mechanical resonance at which the amplitude of vibration becomes excessive. Where the resilient support has relative small spring force the main critical speed can be made substantially less than the desired operating speed. That is to say, the rotor will pass through such critical speed during starting and stopping of the rotor, i.e., starting and stopping of its driving motor. In accordance with the preferred embodiment of the present invention, the rotor is substantially balanced during starting and becomes unbalanced only above such critical speed. During stopping of the rotor it again becomes substantially balanced at a speed above the critical speed. Excessive oscillation when passing through the critical speed is thereby prevented. Such operation is accomplished by employing one or more weights which are movable between two positions. In the first of such positions of the weight, the rotor is substantially balanced and in the second, the rotor is substantially unbalanced. A spring is employed to urge the weight toward the first position and the center of gravity of the weight is positioned such that centrifugal force causes the weight to overcome the spring and move to its second position at speeds above the critical speed. The weight tends to move abruptly between its two positions and the present invention also includes means to retard the rate of such movement so as to prevent unnecessary stresses from being generated in the mounting for the weights.

It is, therefore, an object of our invention to provide a combination vibrator-conveyor which is simple in construction, can easily be maintained sanitary, will operate quietly and efficiently to transport objects without subjecting them to rough handling while at the same time causing them to spread out and assume different positions relative to conveyor. The machine does not have to be held down or fastened to the floor but rests on its legs which are maintained in position only by the weight of the machine itself without any additional weights. Our machine permits ready installation as well as an adaptability to varying conditions in a cannery or other plant where from time to time it is desirable to shorten, lengthen or otherwise change the direction of a conveyor line.

Briefly, we accomplish the object of the invention by providing a mechanism comprising a vibrating table member having a solid flat top surface which is supported for longitudinal oscillatory motion in a direction substantially parallel to such surface. A source of power is provided and flexibly connected to an unbalanced rotor which is resiliently mounted on the frame independently of the table member. The bearing means of such rotor is connected by a flexible member to the table member such that when the machine is in operation the only movement which is transmitted to the table member is a short reciprocating stroke which causes objects placed on the table member to move therealong. Substantially all undesirable and unwanted vibration and motion are eliminated from the table member and from the frame or other support for the table member.

While we have employed our machine particularly in connection with operations in fruit canneries, it will be understood and appreciated by those familiar with the art, that the machine is adaptable to many other uses and it is our intention to cover all such constructions and to limit our invention only as defined in the appended claims.

With reference to the drawings, the machine will be explained in greater detail.

Fig. 1 is a side elevation partly in section;

Fig. 2 is a front elevation looking into the machine;

Fig. 3 is a fragmentary horizontal section taken on the lines 3—3 of Fig. 1;

Fig. 4 is a section taken on the lines 4—4 of Fig. 1;

Fig. 10 is a view showing a modification of the machine in vertical section taken on the line 10—10 of Fig. 11;

Fig. 11 is a vertical section taken on the line 11—11 of Fig. 10;

Fig. 12 is a fragmentary elevation partly in section showing one of the supports for the table element;

Fig. 13 is a radial section through one of the unbalanced rotors of Figs. 10 and 11 on an enlarged scale;

Fig. 14 is a vertical section taken on the line 14—14 of Fig. 13 showing the unbalanced position of the weight; and Fig. 15 is a view similar to Fig. 14 showing the balanced position of the weight.

Figure 5:
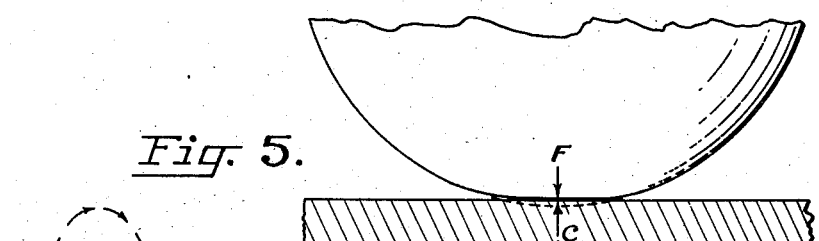
Figs. 5–9 are diagrammatic views illustrated of the theory of operation of the machine.

The machine shown in Figs. 1 to 4 comprises a frame 1 which is suitably fastened to legs (not shown) which rest on the floor. A table member 2 having a solid flat conveying surface or table top substantially parallel to the frame is supported by a plurality of vertical flexible staves 3 which extend between the frame and table member. While we have successfully employed 2″ x ⅛″ oak staves, any similar suitable material can be employed or the top can be otherwise supported as long as it is yieldingly permitted to be moved back and forth in a path extending generally parallel to but at a slight angle to the conveying surface. Brackets 4 fastened to frame 1 secure staves 3 to frame 1 and brackets 5 secured to the bottom of table member 2 secure the upper ends of the staves to the table member. Staves 3 are slightly inclined, with respect to the bottom of the table member and engage it at an acute angle $a$ of about 85 degrees to 90 degrees to the desired direction of travel of material on the table member.

Bracket 6 mounted on frame 1 have supporting resilient blocks 7 made of suitable material such as rubber fastened by bolts 8 to flanges 9 of brackets 6. A bed plate 10 fastened to blocks 7 by bolts 11 has mounted thereon a motor 12 which is fastened to the plate by nuts and bolts 13. We have successfully employed a ½ H.P. electric motor at 3400 r.p.m. as the source of power of our machine. A drive shaft 14 which extends through motor 12 has mounted on either of its ends three pulleys 15, which are of different diameters and may be selectively used depending on the driving speed desired. Flexible belts 16 connect the pulleys with unbalanced wheels or rotors 17 which are mounted on either end of a shaft 18. A metallic sleeve 19, having suitable bearings 20, surrounds shaft 18 between the rotors. An arm 21 extending from sleeve 19 is connected to one end of a coiled spring 22 whose other end is fastened by suitable bolts 23 to plate 10 and supports the rotor mechanism.

The mounting of the rotors is an important feature of the invention and it will be appreciated that their axis or shaft 18 is free to move when the weights are rotated. There is no confining structure such as fixed bearings to prevent the shaft from following its natural elliptical path and it is free floating to this extent.

While two rotors 17 are shown and described as being driven by the motor, the machine will operate if only one of the rotors is driven, or one centrally mounted rotor can be substituted for the two. However, we have found that by employing two rotors the mechanism has greater stability such that undesired motion is prevented from being transmitted to the table member.

There is also connected to arm 21 one end of a flexible driving or connecting rod 24 which is fastened by suitable nuts and bolts 25 to the arm. The other end of rod 24 is fastened by brackets 26 to the bottom of table 2. A throat or indented portion 24′ is provided approximately midway between the ends of member 24. The purpose of identation 24′ is to impart greater flexibility to the member when it is in operation. Rod 24 may be made from any suitable flexible material and a 3 x ¾″ oak wood board has been found to be eminently satisfactory for this purpose. We have also found that rod 24 may be made of rigid material as long as a flexible coupling or hinge is provided at some point along the length of the rod.

The rotors 17 are solid except for an off center hole 27 provided therethrough into which sleeves 28 (Fig. 4) may be inserted. The sleeves are held in place by a spring pressed ball 29 mounted in a bore 30 in the body of rotors 17. Ball 29 registers with a groove 31 in sleeve 28 to hold the sleeve in place. The purpose of the hole in the rotors is to unbalance them and provide an elliptical or eccentric movement of the shaft of the rotors when they are rotated above their critical speed. The degree of this movement can be varied depending upon the weight placed in hole 27 and sleeves of various weights may be interchangeably mounted therein to accomplish this purpose.

The machine operates as follows:

When motor 12 is operated, pulleys 15 are driven and belts 16 rotate rotors 17. Because of the off-balance characteristic of the rotors their axis or shaft 18 will in general describe an elliptical path. Spring support 22 for the rotor mechanism permits substantially free movement of the shaft thereof in a generally vertical direction. Rod 24 which is fastened to shaft 18 via arm 21 is rapidly moved back and forth to move the table member, but otherwise the spring support 22 permits substantially free movement of the shaft in a generally horizontal direction. In general the table member is moved back and forth about an eighth of an inch. The flexible construction of rod 24 and the resilient supports for the rotor and table member combine to substantially eliminate all movement from being transmitted to the frame or table element except the short reciprocating movement which is transmitted to the table member. The longitudinal reciprocating movement of the table member is at a slight angle to the plane of the table surface and causes the material placed thereon to advance at a controlled rate.

Figure 6:
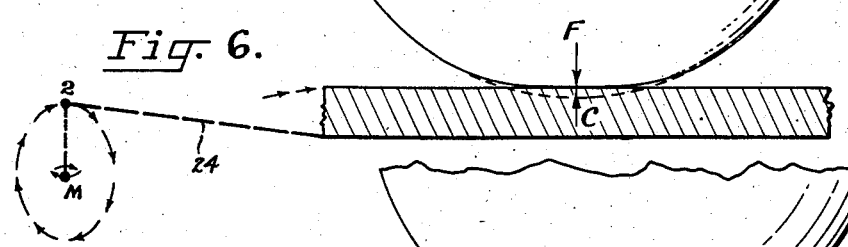
Figure 7:
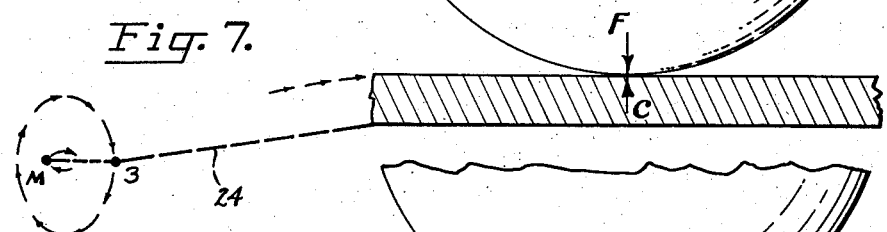
Figure 8:
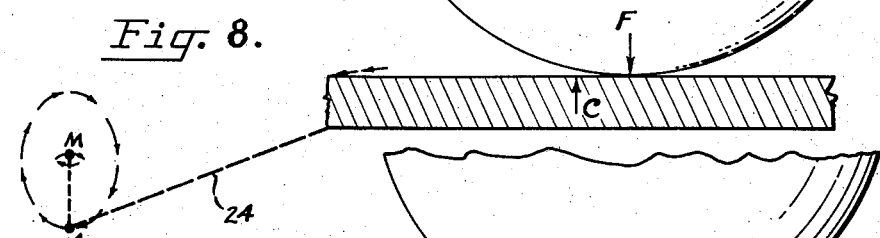
Figure 9:
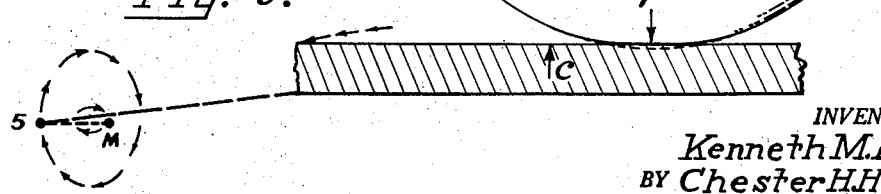

The longitudinal reciprocating motion of the table member at a small angle to its conveying surface is indicated by the arrows at the left end of the portion of the table element shown in Figs. 5 to 9. Such motion can be divided into two components, one parallel to such surface and one normal thereto. Both companies involve substantially simple harmonic motion and are in time phase with each other. When the conveying surface is being accelerated toward objects on said surface due to such normal component, inertia forces are produced which add to the force of gravity intending to hold said objects against such surface, and when such surface is being accelerated away from said objects, inertia forces are produced which subtract from the force of gravity. The result is that inertia forces add to the force of gravity when the table member is at the left of a central position in Figs. 5 to 9, and subtract from the force of gravity when the table member is at the right of such neutral position, such inertia forces being zero at the central position and reaching a maximum at the opposite ends of the stroke of the table member. The resulting forces holding the objects against the conveying surfaces are therefore greater when the conveying surface is being accelerated toward the right in Figs. 5 to 10 than they are when the conveying surface is being accelerated toward the left. The frictional forces parallel to the conveying surface vary with the forces normal to the surface and the further result is that the objects are conveyed to the right in Figs. 5 to 9 as indicated by the arrows F and C representing points in the object and conveyor surface respectively. These figures show a fruit such as a cherry and indicate by the extent of flattening of the fruit at the contact thereof with the conveying surface, the variations of the forces normal to the conveying surface at the various positions of the table member, it being understood, however, that the flattening of the fruit is exaggerated and that such flattening of a resilient object is not essential to the operation of a vibrating conveyor.

A modified vibrating conveyor in which the vibrating motion is substantially completely confined to the table member and an unbalanced rotor so as to be prevented from reaching supporting structure for the conveyor is shown in Figs. 10 to 15, inclusive. The machine of these figures includes a frame having legs 33 at the corners thereof with longitudinally extending side pieces 34 and laterally extending end pieces 35 joining the upper portions of the legs. A table member 37 having a smooth upper conveying surface and outwardly diverging upwardly extending side portions 38 is supported above the frame by means of links 39. Four of such links are shown at the four corners of the frame of the machine but a greater number may be employed. The links 39 are secured at their lower ends to the frame of the machine by means of laterally extending bolts 41 surrounded by rubber bushings 42 in transverse bores in the lower ends of the links. The upper ends of the links 39 are similarly secured by bolts 43 surrounded by rubber bushings 42 in similar bores in the upper ends of the links 39, the bolts 43 extending through brackets 44 suitably secured to the lower surface of the table member 37. It will be apparent that the table member 37 is thus supported for longitudinal reciprocating motion.

The table member 37 is held in the position shown in Fig. 10 with the links 39 extending generally upwardly, by tension springs 46 in axial alignment with each other and having their outer ends connected to longitudinally spaced brackets 47 suitably secured to the lower surface of the table member 37. The adjacent ends of the springs 46 are secured to the upper end of a lever 48 pivoted intermediate its ends to one of the side members 34 of the frame. A sector 49 is secured to such side member and has a slot concentric with the pivot of the lever 48 for receiving one end of a clamping bolt extending through the lever and having a knob 50 threaded thereon for clamping the lever 48 in adjusted position. The lever 48 is employed to adjust the longitudinal position of the table member 37 relative to the frame. That is to say the links 39 can be given in inclination to the left as shown in Fig. 10 or may be vertical or inclined to the right when the table is in the neutral or central position of its vibrating movement. The springs 46, however, permit such longitudinal vibrating movement of the table.

The table member 37 is given a longitudinal reciprocating or vibrating movement by means of an unbalanced rotor mechanism which includes a pair of rotors 52 fixed on opposite ends of a shaft 53, journaled in a bearing structure 54, secured to the free end of a connecting rod 56. The rotor mechanism is positioned below the table member 37 and the connecting rod 56 extends from the bearing structure longitudinally of the table member and upwardly at an angle and has its other end secured to one end of the table member 37 by means of the bracket 57. The connecting rod 56 may be of any suitable material which will repeatedly flex about an axes transverse to its length without breaking but which will transmit forces in the direction of its length. A connecting rod made of a flexible hardwood, such as oak, and having a reduced intermediate portion 58 has been found satisfactory and it is possible to employ a light weight connecting rod pivotally connected to the table. The rotor structure is provided with resilient vertical support by means of a tension spring 59 connected between the bearing structure 54 and a rod 61 extending between the side members 34 of the frame of the machine and positioned above the rotor structure. The spring 59 and flexible connecting rod 56 permit substantially free oscillating motion of the rotors 52 in a generally vertical direction, i.e., at right angles to the connecting rod, but any oscillation of the rotor structure in a direction parallel to the connecting rod 56 is transmitted to the table member 37 by means of the connecting rod 56.

The rotors 52 may be driven from an electric motor 62 supported upon a cross member 63 extending between the side frame members 34. The motor 62 is preferably supported upon conventional resilient motor mountings 64 between the cross members 63 and the motor 62. The motor 62 is provided with step pulleys 66 on each end of its shaft having belt grooves in alignment with the rotors 52 and small flexible belts 67 are employed to drive the rotors 52. The step pulleys providing for three different speeds for the rotors for any given motor speed. Since the amplitude of the oscillation of the rotor structure in a generally horizontal direction, is of the order of one eighth of an inch, substantially no horizontal vibratory motion is transmitted to the motor 62 through the flexible belts.

The operation of the conveyor of Figs. 10 to 15, as thus far described, is substantially the same as that of the conveyor of Figs. 1 to 9. In the position of the lever 48 shown in Fig. 10, material placed on the upper surface of the table member 37 will be conveyed to the right. If the lever 48 is moved to an upright position such that the links 39 are in an upright position at the center portion of the stroke of the table member 37, there will be no net conveying action of material placed on the upper surface of the table member 37. If the lever 48 is moved so as to be inclined to the right in Fig. 10 so as to incline the links 39 also to the right, the conveyor will then cause material to move to the left in such figure. The farther the lever 48 is moved from a central upright position in either direction, the greater the component of oscillating motion which is normal to the conveying surface of the table member 37 and the greater the conveying action. The upper surface of the table member 37 need not be horizontal as the conveyor will move material up a substantial gradient. The position of the lever 48 may be varied to provide the most efficient conveying action for any given material or inclination of the conveying surface of the table member 37.

The tension spring 59 supporting the rotor mechanism has just sufficient spring force to support the weight of such mechanism so that very little of the vibratory motion of the rotor mechanism is transmitted to the frame of the machine. The critical speed of the rotor mechanism will, in general, be much lower than the lowest operating speed of the rotors. The rotors will, however, pass through such critical speed during starting and stopping of the conveyor. In order to prevent an excessive amplitude of vibration at such critical speed, the rotors 52 are preferably maintained in a substantially balanced condition at all speeds which are substantially lower than the lowest operating speed. As shown in Figs. 13 to 15, inclusive, the rotors 52 each include a hollow casing 68 of generally cylindrical form having an open end provided with a suitable closure. The hollow casing is secured to the shaft 53 and has a weight 69 of generally semi-circular shape pivotally mounted at one of its corners on a pivot 71 having its axis parallel to that of the shaft 53. The weight 69 may move between the position shown in Fig. 14 in which the rotor is unbalanced and the position shown in Fig. 15 in which the rotor is substantially balanced. A compression spring 72 positioned within a telescoping spring casing 73 extending through the central portion of the weight 69 and having a lower movable portion may urge the weight toward the balanced condition. The spring force is exerted against the peripheral inner wall of the casing 68 through a ball 74 positioned between the lower end of the movable portion of the spring casing 73 and such peripheral wall. The weight in its balanced position engages against a stop 76 carried by the casing 68. In the position of the weight shown in Fig. 15 the rotor 52 is substantially balanced but the center of gravity of the weight 69 is displaced from the axis of the shaft 53. The strength of the spring 72 is such that the lowest operating speed of the rotor is approached before the weight 69 moves from its position shown in Fig. 15 to its position shown in Fig. 14. Conversely the spring has sufficient strength to move the weight from its position shown in Fig. 14 back to its position shown in Fig. 15 at a speed substantially above critical speed. The result is that the rotor is balanced when being driven at or near to critical speed.

The motion of the weight 69 between its two positions and particularly from the position of Fig. 15 to that of Fig. 14 is abrupt in the absence of a retarding or damping force and subjects the rotor structure to unnecessary stresses. By filling the space in the rotor not occupied by the weight with a hydraulic fluid, such as a lubricating oil, and providing a predetermined clearance between the surfaces of the weight positioned adjacent the inner surfaces of the rotor, the motion of the weight from one position to the other may be damped or retarded such that the abrupt motion above referred to is prevented and the rotor moves smoothly from one of its positions to the other. A filling plug 78 shown in Fig. 13 may be employed for filling the interior of each rotor 52 with a suitable hydraulic fluid.

When the machine is observed in operation, there is substantially no perceptible vibration in the frame or noise from the machine. The mass or weight of the table member and structure moved therewith may be made much less than in prior devices so that unbalanced weights of lesser size can be employed and the forces causing longitudinal vibration of the table member are largely exerted between the table member and the weights and are not transmitted to the frame of the machine. Vibrations normal to the direction of vibration of the table member are also largely prevented from reaching the frame and it has been found that no fixed foundation is necessary but that the frame may be mounted on wheels to render the conveyor portable or may be suspended from a ceiling without appreciable transmission of vibrations to such ceiling. The material on the conveyor is not subjected to uncontrolled components of motion normal to the surface of the conveyor or to any shocks from operation of the machinery and flows smoothly along. When the travel of material is stopped, as by placing an object across the conveyor, the material will not all pile up against such object but will remain in a thin layer on the conveyor.

We claim:
1. A vibrating conveyor comprising a conveying element having an upwardly facing surface for receiving material to be conveyed, frame means supporting said conveying element for oscillating motion having a major component parallel to said surface and a component normal to said surface which is small relative to said major component, a connecting rod extending in the direction of oscillating motion of said conveying element and having one end connected thereto, bearing means carried by the other end of said rod, and unbalanced rotor means journaled in said bearing means for rotation about an axis at right angles to said connecting rod, resilient means for supporting said bearing means and said other end of said rod to provide for substantially free oscillation of said bearing means in a direction at right angles to said connecting rod and to said axis and to provide for the transmission of reaction forces between said rotor means and said conveying element longitudinally through said connecting rod, motor means, means separate from said conveying element and said bearing means for supporting said motor means, and flexible driving means between said motor means and said rotor means to drive said rotor means and cause said rotor means to oscillate said conveying element without imparting substantial oscillating motion to said motor means or said frame means.

2. A vibrating conveyor comprising a conveying element having an upwardly facing surface for receiving material to be conveyed, frame means supporting said conveying element for oscillating motion having a major component parallel to said surface and a component normal to said surface which is small relative to said major component, a connecting rod extending in the direction of oscillating motion of said conveying element and having one end connected thereto, bearing means carried by the other end of said rod, an unbalanced rotor means journaled in said bearing means for rotation about an axis at right angles to said connecting rod, resilient means for supporting said bearing means and said other end of said rod to provide for substantially free oscillation of said bearing means in a direction at right angles to said connecting rod and to said axis and to provide for the transmission of reaction forces between said rotor means and said conveying element longitudinally through said connecting rod, motor means, means separate from said conveying element and said bearing means for supporting said motor means, flexible driving means between said motor means and said rotor means to drive said rotor means and cause said rotor means to oscillate said conveying element without imparting substantial oscillating motion to said motor means or said frame means, said motor means being positioned on the other side of said rotor means from said connecting rod and said flexible driving means including a belt extending in a direction longitudinally of said conveying element between said motor means and said rotor means.

3. A vibrating conveyor comprising a conveying element having an upwardly facing surface for receiving material to be conveyed, frame means, resilient supporting means for said conveying element including a plurality of vertically extending supports between said frame and said conveying element providing for oscillating motion of said conveying element having a major component parallel to said surface and a component normal to said surface which is small relative to said major component, a connecting rod extending in the direction of oscillating motion of said conveying element and having one end connected thereto, bearing means carried by the other end of said rod, an unbalanced rotor means journaled in said bearing means for rotation about an axis at right angles to said connecting rod, resilient means for supporting said bearing means and said other end of said rod to provide for substantially free oscillation of said bearing means in a direction at right angles to said connecting rod and to said axis and to provide for the transmission of reaction forces between said rotor means and said conveying elements longitudinally through said connecting rod, motor means, means separate from said conveying element and said bearing means for supporting said motor means, and flexible driving means between said motor means and said rotor means to drive said rotor means and cause said rotor means to oscillate said conveying element without imparting substantial oscillating motion to said motor means or said frame means.

4. A vibrating conveyor comprising a conveying element having an upwardly facing surface for receiving material to be conveyed, frame means, supporting means for said conveying element including a plurality of links extending generally vertically from said frame means to said conveying element and opposed coil springs extending substantially longitudinally of said conveying element between said frame means and conveying element to provide for oscillating motion of said conveying element having a major component parallel to said surface and a component normal to said surface which is small relative to said major component, means for adjusting the point of attachment of said springs to said frame in a direction longitudinally of said conveying element to vary the amplitude of said normal component relative to said parallel component, a connecting rod extending in the direction of oscillating motion of said conveying element and having one end connected thereto, bearing means carried by the other end of said rod, an unbalanced rotor means journaled in said bearing means for rotation about an axis at right angles to said connecting rod, resilient means for supporting said bearing means and said other end of said rod to provide for substantially free oscillation of said bearing means in a direction at right angles to said connecting rod and to said axis and to provide for the transmission of reaction forces between said rotor means and said conveying element longitudinally through said connecting rod, motor means, means separate from said conveying element and said bearing means for supporting said motor means, and flexible driving means between said motor means and said rotor means to drive said rotor means and cause said rotor means to oscillate said conveying element without imparting substantial oscillating motion to said motor means or said frame means.

5. A vibrating conveyor comprising a conveying element having an upwardly facing surface for receiving material to be conveyed, frame means supporting said conveying element for oscillating motion having a major component parallel to said surface and a component normal to said surface which is small relative to said major component, a connecting rod extending in the direction of oscillating motion of said conveying element and having one end connected thereto, bearing means carried by the other end of said rod, an unbalanced rotor means journaled in said bearing means for rotation about an axis at right angles to said connecting rod, resilient means for supporting said bearing means and said other end of said rod to provide for substantially free oscillation of said bearing means in a direction at right angles to said connecting rod and to said axis and to provide for the transmission of reaction forces between said rotor means and said conveying element longitudinally through said connecting rod, motor means, means separate from said conveying element and said bearing means for supporting said motor means, flexible driving means between said motor means and said rotor means to drive said rotor means and cause said rotor means to oscillate said conveying element without imparting substantial oscillating motion to said motor means or said frame means, said motor means driving said rotor means at an operating speed greater than the critical speed so that the speed of said rotor means passes through said critical speed when said driving means is started and stopped, said rotor means having a weight movable between a first position in which said rotor means is substantially balanced and a second position in which said rotor means is unbalanced, resilient means urging said weight to said first position, the center of gravity of said weight when in said first position being displaced from the axis of rotation of said rotor means so that centrifugal force urges said weight toward said second position when said rotor means is rotated, said last-mentioned resilient means being balanced against said centrifugal force so that said weight moves between said positions at speeds above said critical speed and below said operating speed when said driving means is started and stopped, and hydraulic means in said rotor means retarding the movement of said weight between said position.

6. A vibrating mechanism comprising an element supported for oscillating motion, means for producing said oscillating motion including an unbalanced rotor means connected to said element, bearing means for said rotor means, resilient means supporting said bearing means so that said rotor means has a critical speed tending to produce excessive oscillation of said rotor means, means for driving said rotor means at an operating speed greater than said critical speed so that the speed of said rotor means passes through said critical speed when said driving means is started and stopped, said rotor means having a weight movable between a first position in which said rotor means is substantially balanced and a second position in which said rotor means is unbalanced, resilient means urging said weight to said first position, the center of gravity of said weight when in said first position being displaced from the axis of rotation of said rotor means so that centrifugal force urges said weight toward said second position when said rotor means is rotated, said last mentioned resilient means being balanced against said centrifugal force so that said weight moves between said positions at speeds above said critical speed and below said operating speed when said driving means is started and stopped, and hydraulic means in said rotor means retarding the movement of said weight between said positions.

7. A vibrating mechanism comprising an element supported for oscillating motion, means for producing said oscillating motion including an unbalanced rotor means connected to said element, bearing means for said rotor means, resilient means supporting said bearing means so that said rotor means has a critical speed tending to produce excessive oscillation of said rotor means, means for driving said rotor means at an operating speed greater than said critical speed so that the speed of said rotor means passes through said critical speed when said driving means is started and stopped, said rotor means including a hollow cylindrical casing, a semi-cylindrical weight pivoted at one corner so as to be movable between a first position in which said rotor means is substantially balanced and a second position in which said rotor means is unbalanced, resilient means urging said weight to said first position, the center of gravity of said weight when in said first position being displaced from the axis of rotation of said rotor means so that centrifugal force urges said weight toward said second position when said rotor means is rotated, said last mentioned resilient means being balanced against said centrifugal force so that said weight moves between said positions at speeds above said critical speed and below said operating speed when said driving means is started and stopped, the sides of said weight having a predetermined clearance with respect to the inner walls of said casing, and said casing being otherwise filled with a liquid for retarding the movement of said weight between said positions.

8. A vibrating conveyor comprising a conveying element having an upwardly facing surface for receiving material to be conveyed, frame means, supporting means for said conveying element including a plurality of links extending generally vertically from said frame means to said conveying element and each having a pivotal connection at one of its ends to said frame means and at the other of its ends to said conveying element, the axes of the pivotal connections being parallel to each other and extending transversely of said conveying element, and opposed coil springs extending substantially longitudinally of said conveying element between said frame means and conveying element for resiliently holding said conveying element in position relative to said frame to hold said links at an average inclination providing for oscillating motion of said conveying element having a major component parallel to said surface and a component normal to said surface which is small relative to said major component, means for adjusting the point of attachment of said springs to said frame in a direction longitudinally of said conveying element to vary said average inclination of said links to thereby vary the amplitude of said normal component relative to said parallel component, and power means for imparting an oscillatory motion to said conveying element in a direction longitudinally of said conveying element.

9. A vibrating device comprising a conveying element having an upwardly facing surface for receiving material to be moved on said surface, frame means for said conveying element, supporting means for said conveying element including a plurality of spaced links extending generally vertically from said frame means to said conveying element, said links each being pivoted at one end to said conveying element and each being pivoted at its other end to said frame means, the axes about which the ends of said links are pivoted being parallel to each other to provide for movement of said conveying element relative to said frame means in opposite directions normal to said axes, a pair of opposed spring means each having one end operatively connected to said conveying element and its other end operatively connected to said frame means, said spring means respectively resiliently urging said conveying element oppositely in said directions with respect to said frame means and being balanced against each other for holding said conveying element in position relative to said frame to hold said links at an average inclination providing for oscillating motion of said conveying element having a major component parallel to said surface and a minor component normal to said surface, means for relatively adjusting the points of connection of said spring means to said conveying element in said directions with respect to the points of connection of said spring means to said frame means to vary said average inclination of said links to thereby vary the amplitude of said normal component relative to said parallel component, and power means for oscillating said conveying element in said directions.

References Cited in the file of this patent

FOREIGN PATENTS 162,605   Australia _____ Apr. 27, 1955